US012696076B2

(12) United States Patent
Hong

(10) Patent No.: US 12,696,076 B2
(45) Date of Patent: Jul. 28, 2026

(54) CAPABILITY EXCHANGE METHOD AND APPARATUS, AND EXCHANGE TRIGGERING METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 455 days.

(21) Appl. No.: 18/277,574

(22) PCT Filed: Feb. 19, 2021

(86) PCT No.: PCT/CN2021/076893
§ 371 (c)(1),
(2) Date: Aug. 16, 2023

(87) PCT Pub. No.: WO2022/174393
PCT Pub. Date: Aug. 25, 2022

(65) Prior Publication Data
US 2024/0129718 A1       Apr. 18, 2024

(51) Int. Cl.
*H04W 60/00*       (2009.01)
*H04W 8/20*       (2009.01)
(Continued)

(52) U.S. Cl.
CPC ............. *H04W 8/24* (2013.01); *H04W 8/205* (2013.01); *H04W 68/02* (2013.01)

(58) Field of Classification Search
None
See application file for complete search history.

(56) References Cited

U.S. PATENT DOCUMENTS

2022/0159607 A1* 5/2022 Singh .................... H04W 48/18

FOREIGN PATENT DOCUMENTS

| CN | 107690134 A | 2/2018 | |
|---|---|---|---|
| TW | 201743646 A | 12/2017 | |
| WO | WO-2021233527 A1 * | 11/2021 | ............ H04W 8/183 |

OTHER PUBLICATIONS

Interdigital Inc. "Solution for KI #2: Enabling Paging Reception for Multi-USIM Device" SA WG2 Meeting #136, S2-1911796, Nov. 2019, 3 pages.

(Continued)

*Primary Examiner* — Gary Lafontant
(74) *Attorney, Agent, or Firm* — Cozen O'Connor

(57)       ABSTRACT

A method for capability exchange performed by a base station includes: exchanging, with a core network, capability information for solving a multi-card communication conflict problem in a terminal. Another method for capability exchange performed by a core network includes: exchanging, with a base station, capability information for solving a multi-card communication conflict problem in a terminal. A method for exchange triggering performed by a terminal includes: in response to there being a multi-card communication conflict, sending a multi-card communication conflict problem to at least one of a base station and a core network, so as to trigger that capability information of the base station for solving the multi-card communication conflict is exchanged with the core network, or capability information of the core network for solving the multi-card communication conflict is exchanged with the base station.

19 Claims, 11 Drawing Sheets exchanging, with a core network, capability information for solving a multi-card communication conflict problem in a terminal       ∽S101

(51) Int. Cl.
H04W 8/24 (2009.01)
H04W 68/02 (2009.01)

(56) References Cited

OTHER PUBLICATIONS

Intel et al. "Solution for Paging Reception with PO collision avoidance" SA WG2 Meeting #S2-136, S2-1911942, Nov. 2019, 4 pages.
Chinese Patent Application No. 202180000601.0, Office Action with English translation dated Sep. 21, 2022, 15 pages.
Indian Patent Application No. 202347062230, Office Action dated May 22, 2025, 5 pages.

* cited by examiner exchanging, with a core network, capability information for solving a multi-card communication conflict problem in a terminal ~S101

FIG. 1 in response to setting up an interface with the core network, exchanging, with the core network, the capability information for solving the multi-card communication conflict problem in the terminal ~S201

FIG. 2A

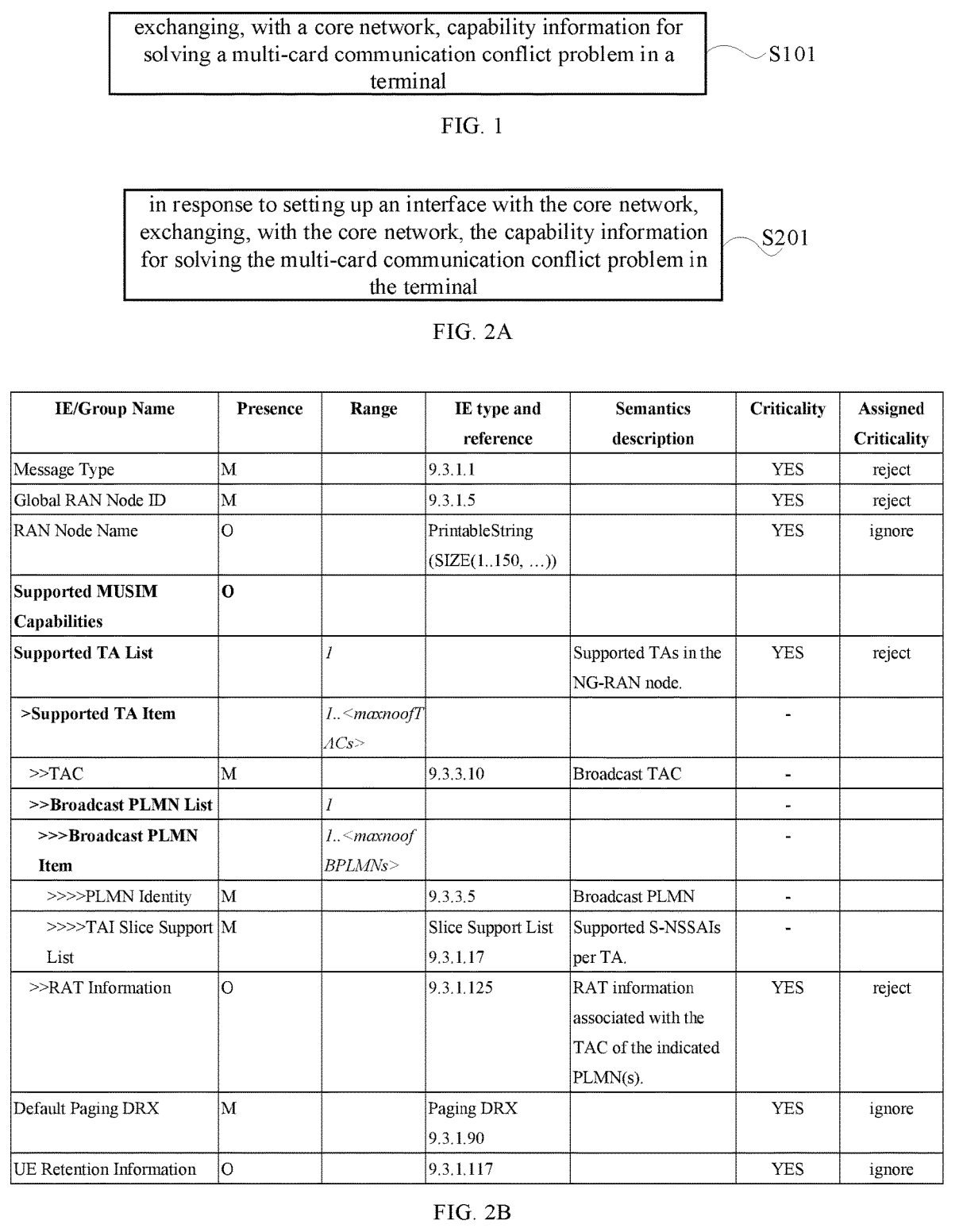

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Global RAN Node ID | M | | 9.3.1.5 | | YES | reject |
| RAN Node Name | O | | PrintableString (SIZE(1..150, ...)) | | YES | ignore |
| Supported MUSIM Capabilities | O | | | | | |
| Supported TA List | | *1* | | Supported TAs in the NG-RAN node. | YES | reject |
| >Supported TA Item | | *1..<maxnoofTACs>* | | | - | |
| >>TAC | M | | 9.3.3.10 | Broadcast TAC | - | |
| >>Broadcast PLMN List | | *1* | | | - | |
| >>>Broadcast PLMN Item | | *1..<maxnoof BPLMNs>* | | | - | |
| >>>>PLMN Identity | M | | 9.3.3.5 | Broadcast PLMN | - | |
| >>>>TAI Slice Support List | M | | Slice Support List 9.3.1.17 | Supported S-NSSAIs per TA. | - | |
| >>RAT Information | O | | 9.3.1.125 | RAT information associated with the TAC of the indicated PLMN(s). | YES | reject |
| Default Paging DRX | M | | Paging DRX 9.3.1.90 | | YES | ignore |
| UE Retention Information | O | | 9.3.1.117 | | YES | ignore |

FIG. 2B

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| eNB Name | O | | PrintableString(SIZE(1..150,...)) | | YES | ignore |
| Supported MUSIM Capabilities | O | | X.X.X.X | | | |
| Supported TAs | | *1..<maxnoofTACs>* | | Supported TAs in the eNB. | GLOBAL | reject |
| >TAC | M | | 9.2.3.7 | Broadcast TAC. | - | |
| >Broadcast PLMNs | | *1..<maxnoofBPLMNs>* | | Broadcast PLMNs. | - | |
| >>PLMN Identity | M | | 9.2.3.8 | | | |
| >RAT-Type | O | | 9.2.1.117 | RAT-Type associated with the TAC of the indicated PLMN(s). | YES | reject |
| Default Paging DRX | M | | 9.2.1.16 | | YES | ignore |
| CSG Id List | | *0..1* | | | GLOBAL | reject |
| >CSG Id | | *1 .. <maxnoofCSGIds>* | 9.2.1.62 | | | |
| UE Retention Information | O | | 9.2.1.112 | | YES | ignore |
| NB-IoT Default Paging DRX | O | | 9.2.1.114 | | YES | ignore |
| Connected en-gNB List | | *<0.. maxnoofConnecteden-gNBs>* | | | GLOBAL | ignore |
| >en-gNB ID | M | | 9.2.1.37a | | | |
| >Supported TAs | | *1..<maxnoofTACs>* | | Supported (EPS) TAs in the en-gNB. | - | |
| >>Configured TAC | M | | TAC 9.2.3.7 | This information is used as specified in TS 36.300 [14]. | - | |
| >>Broadcast PLMNs | | *1..<maxnoofBPLMNs>* | | Broadcast PLMNs. | - | |
| >>>PLMN Identity | M | | 9.2.3.8 | | | |

FIG. 2C

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| eNB Name | O | | PrintableString(SIZE(1..150,...)) | | YES | ignore |
| Supported TAs | | *1..<maxnoofTACs>* | | Supported TAs in the eNB. | GLOBAL | reject |
| >TAC | M | | 9.2.3.7 | Broadcast TAC. | - | |
| >Broadcast PLMNs | | *1..<maxnoofBPLMNs>* | | Broadcast PLMNs. | - | |
| >>PLMN Identity | M | | 9.2.3.8 | | | |
| >RAT-Type | O | | 9.2.1.117 | RAT-Type associated with the TAC of the indicated PLMN(s). | YES | reject |
| Default Paging DRX | M | | 9.2.1.16 | | YES | ignore |
| CSG Id List | | *0..1* | | | GLOBAL | reject |
| >CSG Id | | *1 .. <maxnoofCSGIds>* | 9.2.1.62 | | | |
| UE Retention Information | O | | 9.2.1.112 | | YES | ignore |
| NB-IoT Default Paging DRX | O | | 9.2.1.114 | | YES | ignore |
| Connected en-gNB List | | *<0.. maxnoofConnecteden-gNBs>* | | | GLOBAL | ignore |
| >Supported MUSIM Capabilities | O | | X.X.X.X | | | |
| >en-gNB ID | M | | 9.2.1.37a | | | |
| >Supported TAs | | *1..<maxnoofTACs>* | | Supported (EPS) TAs in the en-gNB. | - | |
| >>Configured TAC | M | | TAC 9.2.3.7 | This information is used as specified in TS 36.300 [14]. | - | |
| >>Broadcast PLMNs | | *1..<maxnoofBPLMNs>* | | Broadcast PLMNs. | - | |
| >>>PLMN Identity | M | | 9.2.3.8 | | | |

FIG. 2D

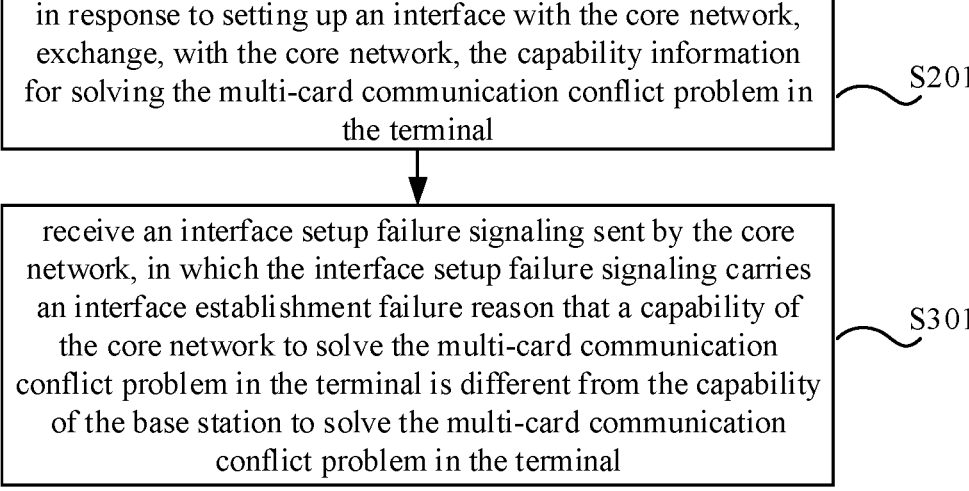

in response to setting up an interface with the core network, exchange, with the core network, the capability information for solving the multi-card communication conflict problem in the terminal          ⟩S201 receive an interface setup failure signaling sent by the core network, in which the interface setup failure signaling carries an interface establishment failure reason that a capability of the core network to solve the multi-card communication conflict problem in the terminal is different from the capability of the base station to solve the multi-card communication conflict problem in the terminal          ⟩S301

FIG. 3

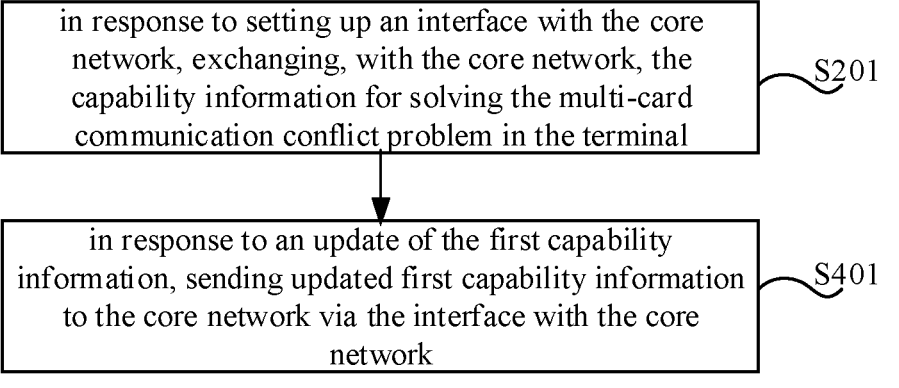

in response to setting up an interface with the core network, exchanging, with the core network, the capability information for solving the multi-card communication conflict problem in the terminal          ⟩S201 in response to an update of the first capability information, sending updated first capability information to the core network via the interface with the core network          ⟩S401

FIG. 4 in response to setting up an interface with the core network, receiving second capability information sent by the core network, in which the second capability information is configured to indicate a capability of the core network to solve the multi-card communication conflict problem in the terminal          ⟩S501

FIG. 5A

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF Name | M | | 9.3.3.21 | | YES | reject |
| Supported MUSIM Capabilities | O | | | | | |
| Served GUAMI List | | 1 | | | YES | reject |
| >Served GUAMI Item | | 1..<*maxno ofServedG UAMIs*> | | | - | |
| >>GUAMI | M | | 9.3.3.3 | | - | |
| >>Backup AMF Name | O | | AMF Name 9.3.3.21 | | - | |
| >>GUAMI Type | O | | ENUMERATED (native, mapped, ...) | | YES | ignore |
| Relative AMF Capacity | M | | 9.3.1.32 | | YES | ignore |
| PLMN Support List | | 1 | | | YES | reject |
| >PLMN Support Item | | 1..<*maxno ofPLMNs*> | | | - | |
| >>PLMN Identity | M | | 9.3.3.5 | | - | |
| >>Slice Support List | M | | 9.3.1.17 | Supported S-NSSAIs per PLMN | - | |
| Criticality Diagnostics | O | | 9.3.1.3 | | YES | ignore |
| UE Retention Information | O | | 9.3.1.117 | | YES | ignore |

FIG. 5B

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME Name | O | | PrintableString( SIZE(1..150,...)) | | YES | ignore |
| Supported MUSIM Capabilities | O | | X.X.X.X | | | |
| Served GUMMEIs | | *1..<maxn oofRATs >* | | The LTE related pool configuration is included on the first place in the list. | GLOBAL | reject |
| >Served PLMNs | | *1..<maxn oofPLM NsPerM ME>* | | | - | |
| >>PLMN Identity | M | | 9.2.3.8 | | - | |
| >Served GroupIDs | | *1..<maxn oofGrou pIDs>* | | | - | |
| >>MME Group ID | M | | OCTET STRING (SIZE(2)) | | - | |
| >Served MMECs | | *1..<maxn oofMME Cs>* | | | - | |
| >>MME Code | M | | 9.2.3.12 | | - | |
| >GUMMEI Type | O | | ENUMERATED (native, mapped, ..., mappedFrom5G ) | | - | ignore |
| Relative MME Capacity | M | | 9.2.3.17 | | YES | ignore |
| MME Relay Support Indicator | O | | 9.2.1.82 | | YES | ignore |
| Criticality Diagnostics | O | | 9.2.1.21 | | YES | ignore |
| UE Retention Information | O | | 9.2.1.112 | | YES | ignore |
| Served DCNs | | *0..<maxn oofDCNs >* | | | GLOBAL | ignore |
| >Served DCNs Items | M | | 9.2.1.121 | | - | |

FIG. 5C

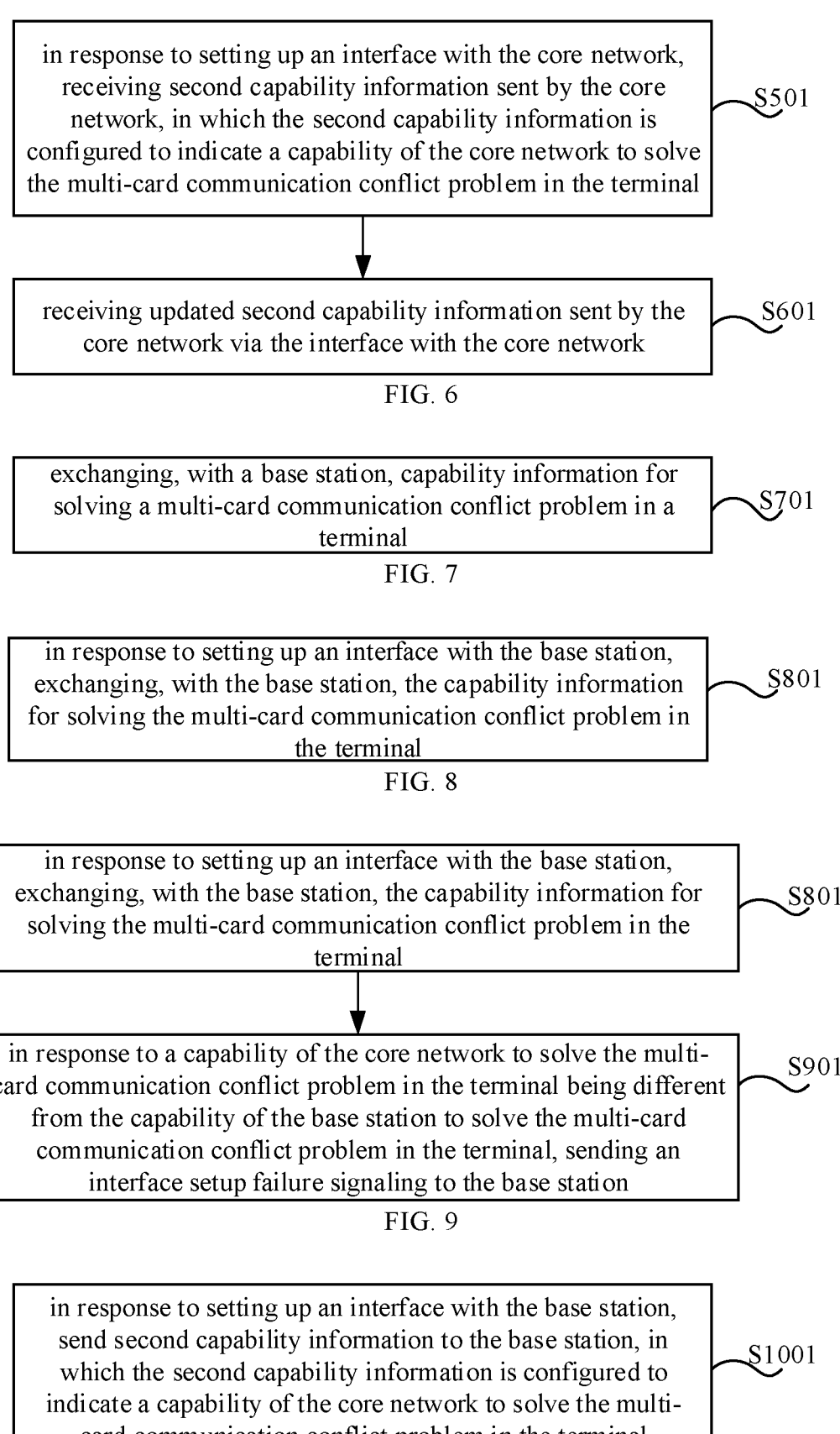

in response to setting up an interface with the core network, receiving second capability information sent by the core network, in which the second capability information is configured to indicate a capability of the core network to solve the multi-card communication conflict problem in the terminal —— S501 receiving updated second capability information sent by the core network via the interface with the core network —— S601

FIG. 6 exchanging, with a base station, capability information for solving a multi-card communication conflict problem in a terminal —— S701

FIG. 7 in response to setting up an interface with the base station, exchanging, with the base station, the capability information for solving the multi-card communication conflict problem in the terminal —— S801

FIG. 8 in response to setting up an interface with the base station, exchanging, with the base station, the capability information for solving the multi-card communication conflict problem in the terminal —— S801 in response to a capability of the core network to solve the multi-card communication conflict problem in the terminal being different from the capability of the base station to solve the multi-card communication conflict problem in the terminal, sending an interface setup failure signaling to the base station —— S901

FIG. 9 in response to setting up an interface with the base station, send second capability information to the base station, in which the second capability information is configured to indicate a capability of the core network to solve the multi-card communication conflict problem in the terminal —— S1001

FIG. 10

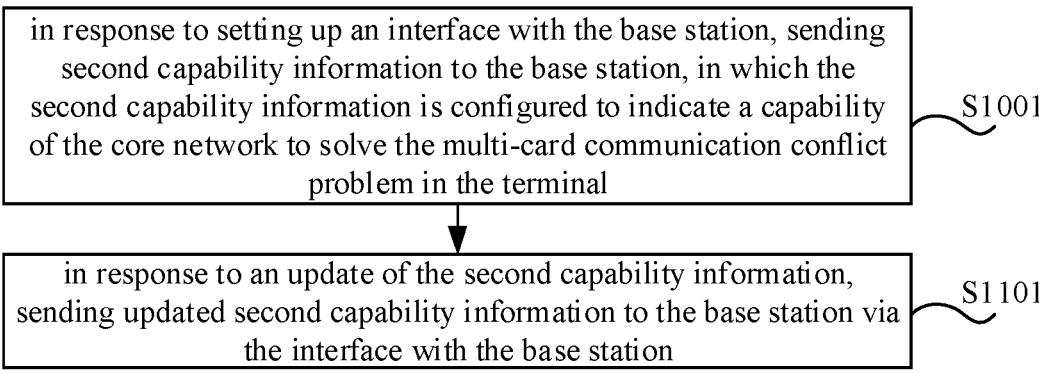

in response to setting up an interface with the base station, sending second capability information to the base station, in which the second capability information is configured to indicate a capability of the core network to solve the multi-card communication conflict problem in the terminal — S1001 in response to an update of the second capability information, sending updated second capability information to the base station via the interface with the base station — S1101

FIG. 11

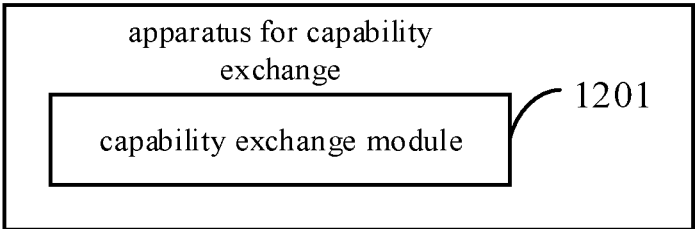

apparatus for capability exchange capability exchange module — 1201

FIG. 12

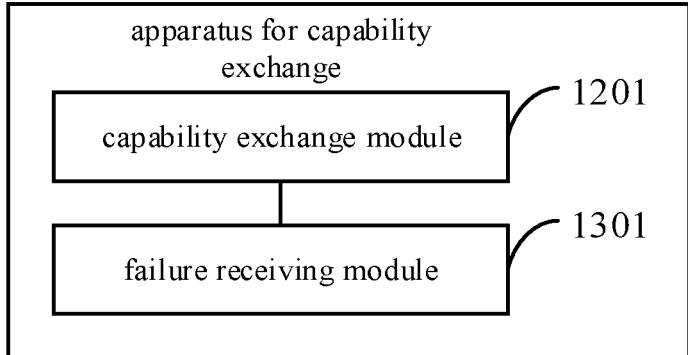

apparatus for capability exchange capability exchange module — 1201 failure receiving module — 1301

FIG. 13

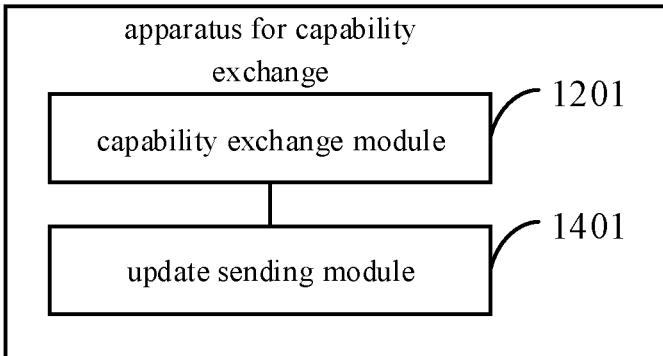

apparatus for capability exchange capability exchange module — 1201 update sending module — 1401

FIG. 14

CAPABILITY EXCHANGE METHOD AND APPARATUS, AND EXCHANGE TRIGGERING METHOD AND APPARATUS

RELATED APPLICATIONS

This application is the U.S. national application of International Application No. PCT/CN2021/076893, filed on Feb. 19, 2021, the entire contents of which are incorporated herein by reference.

TECHNICAL FIELD

The disclosure relates to a field of communication technology, in particular to a method for capability exchange, a method for exchange triggering, an apparatus for capability exchange, an apparatus for exchange triggering, a communication device, and a computer-readable storage medium.

BACKGROUND

A plurality of Subscriber Identity Module (SIM) cards are provided in a multi-card terminal, and the terminal can communicate through the plurality of SIM cards. However, during a communication process, communication conflict may occur between the SIM cards, which affects a communication effect of the terminal. In this regard, the communication conflict can be resolved by a base station or a core network.

SUMMARY

According to a first aspect of the disclosure, a method for capability exchange, applied to a base station, is provided. The method includes:

exchanging, with a core network, capability information for solving a multi-card communication conflict problem in a terminal.

According to a second aspect of the disclosure, a method for capability exchange, applied to a core network, is provided. The method includes:

exchanging, with a base station, capability information for solving a multi-card communication conflict problem in a terminal.

According to a third aspect of the disclosure, a method for exchange triggering, applied to a terminal, is provided. The method includes:

in response to a multi-card communication conflict, sending a multi-card communication conflict problem to at least one of a base station or a core network, so as to trigger that capability information of the base station for solving the multi-card communication conflict is exchanged with the core network, or capability information of the core network for solving the multi-card communication conflict is exchanged with the base station.

BRIEF DESCRIPTION OF THE DRAWINGS

In order to clearly illustrate technical solutions of embodiments of the disclosure, a brief description of drawings used in the embodiments is given below. The drawings in the following descriptions are only some embodiments of the disclosure, and for those skilled in the art, other drawings can be obtained according to these drawings.

FIG. 1 is a flowchart illustrating a method for capability exchange according to an embodiment of the disclosure.

FIG. 2A is a flowchart illustrating another method for capability exchange according to an embodiment of the disclosure.

FIG. 2B is a schematic diagram illustrating a NG interface setup request signaling according to an embodiment of the disclosure.

FIG. 2C is a schematic diagram illustrating a S1 interface setup request signaling according to an embodiment of the disclosure.

FIG. 2D is a schematic diagram illustrating another S1 interface setup request signaling according to an embodiment of the disclosure.

FIG. 3 is a flowchart illustrating another method for capability exchange according to an embodiment of the disclosure.

FIG. 4 is a flowchart illustrating another method for capability exchange according to an embodiment of the disclosure.

FIG. 5A is a flowchart illustrating another method for capability exchange according to an embodiment of the disclosure.

FIG. 5B is a schematic diagram illustrating a NG interface setup response signaling according to an embodiment of the disclosure.

FIG. 5C is a schematic diagram illustrating a S1 interface setup response signaling according to an embodiment of the disclosure.

FIG. 6 is a flowchart illustrating another method for capability exchange according to an embodiment of the disclosure.

FIG. 7 is a flowchart illustrating another method for capability exchange according to an embodiment of the disclosure.

FIG. 8 is a flowchart illustrating another method for capability exchange according to an embodiment of the disclosure.

FIG. 9 is a flowchart illustrating another method for capability exchange according to an embodiment of the disclosure.

FIG. 10 is a flowchart illustrating another method for capability exchange according to an embodiment of the disclosure.

FIG. 11 is a flowchart illustrating another method for capability exchange according to an embodiment of the disclosure.

FIG. 12 is a schematic diagram illustrating an apparatus for capability exchange according to an embodiment of the disclosure.

FIG. 13 is a schematic diagram illustrating another apparatus for capability exchange according to an embodiment of the disclosure.

FIG. 14 is a schematic diagram illustrating another apparatus for capability exchange according to an embodiment of the disclosure.

DETAILED DESCRIPTION

Figure 15:
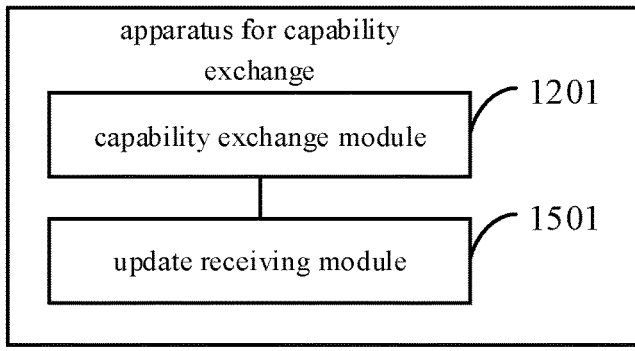
FIG. 15 is a schematic diagram illustrating another apparatus for capability exchange according to an embodiment of the disclosure.

The technical solutions in the embodiments of the disclosure will be described clearly and completely below in combination with the accompanying drawings in the embodiments of the disclosure. The described embodiments are only a part of the embodiments of the disclosure, and not all of the embodiments. Based on the embodiments of the disclosure, other embodiments obtained by those skilled in the art fall within the scope of protection of the disclosure.

According to the embodiments of the disclosure, the core network is caused to determine the capability of the base station to solve the multi-card communication conflict problem in the terminal, and the base station is caused to determine the capability of the core network to solve the multi-card communication conflict problem in the terminal, so that the core network can collaborate with the base station in resolving the communication conflict problem in the terminal in a more comprehensive manner.

FIG. 1 is a flowchart illustrating a method for capability exchange according to an embodiment of the disclosure. The method for capability exchange shown in this embodiment may be applicable to a base station. The base station can communicate with a terminal and a core network. The terminal includes but is not limited to, electronic devices such as a cell phone, a tablet computer, a wearable device, a sensor, and an Internet of Things (IoT) device. The base station includes but is not limited to, base stations in a communication system such as a 4G base station, a 5G base station, and a 6G base station. The core network includes but is not limited to, core networks in the communication system such as a 4G core network, a 5G core network, and a 6G core network.

As illustrated in FIG. 1, the method for capability exchange includes the following steps.

At step S101, capability information for solving a multi-card communication conflict problem in a terminal is exchanged with a core network.

In an embodiment, multiple SIM cards may be set in the terminal, such as universal SIM (USIM) cards. The SIM cards may be traditional SIM cards or eSIM cards, i.e., embedded SIM cards. The multiple SIM cards may belong to the same operator network, or may belong to different operator networks.

When the terminal uses the multiple SIM cards, communication conflict may occur between the multiple SIM cards. The terminal can send a communication conflict problem to the base station, and the base station can determine a solution. The multi-card communication conflict problem may refer to the problem caused by a communication conflict between two or more SIM cards, and the multiple SIM cards described below mainly includes a first SIM card and a second SIM card.

It should be noted that the first SIM card and the second SIM card do not refer to two specific SIM cards in the terminal, but generally refer to any two different SIM cards in the terminal.

In an embodiment, the base station may determine its own capability to solve the multi-card communication conflict problem in the terminal, so that the base station may generate first capability information based on its own capability of solving the multi-card communication conflict problem in the terminal, and send the first capability information to the core network, so as to exchange with the core network, the capability information for solving the multi-card communication conflict problem in the terminal.

The base station exchanges the capability information for solving the multi-card communication conflict problem in the terminal with the core network, which includes sending the first capability information to the core network, and receiving second capability information sent by the core network. The second capability information is configured to indicate a capability of the core network to solve the multi-card communication conflict problem in the terminal.

On the basis, the core network may determine the capability of the base station to solve the multi-card communication conflict problem in the terminal, and the base station may determine the capability of the core network to solve the multi-card communication conflict problem in the terminal, so that the core network may cooperate with the base station in resolving the communication conflict problem in the terminal in a more comprehensive manner.

In addition, the base station may determine capabilities of other base stations connected to the base station to solve the multi-card communication conflict problem in the terminal. The first capability information indicates both the capability of the base station to solve the multi-card communication conflict problem in the terminal and the capabilities of other base stations connected to the base station to solve the multi-card communication conflict problem in the terminal.

In some embodiments, the capability information for solving the multi-card communication conflict problem in the terminal includes one of:

being capable of solving the multi-card communication conflict problem in the terminal, and being incapable of solving the multi-card communication conflict problem in the terminal.

In an embodiment, the capabilities of different base stations to solve the multi-card communication conflict problem may be different. Roughly speaking, the capability of solving the multi-card communication conflict problem includes: being capable of solving the multi-card communication conflict problem in the terminal, and being incapable of solving the multi-card communication conflict problem in the terminal. In detail, the capability of solving the communication conflict problem may be as specific as a way that the multi-card communication conflict problem in the terminal is able to be solved, a type of the multi-card communication conflict problem in the terminal that is able to be solved, and so on.

In an embodiment, for example, the base station is capable of solving the multi-card communication conflict problem, and the core network is incapable of solving the multi-card communication conflict problem.

By exchanging the capability information for solving the multi-card communication conflict problem in the terminal with the base station, the core network may determine that the base station is capable of solving the multi-card communication conflict problem. When the terminal in communication with the core network needs to solve the multi-card communication conflict problem, the core network may send the multi-card communication conflict problem to be solved by the terminal to the base station, so that the base station may determine the solution and send the solution to the terminal after obtaining the solution. As such, the core network cooperates with the base station to solve the communication conflict problem for the terminal. Alternatively, the core network may instruct the base station to establish a communication connection with the terminal, so that the terminal may report the multi-card communication conflict problem to the base station via the communication connection, to obtain the solution from the base station.

In some embodiments, in response to the capability information for solving the multi-card communication conflict problem in the terminal including being capable of solving the multi-card communication conflict problem in the terminal, the capability information for solving the multi-card communication conflict problem in the terminal is further configured to indicate a way that the multi-card communication conflict problem in the terminal is able to be solved.

In some embodiments, the way includes at least one of: changing a user equipment identity of a SIM card, providing an offset corresponding to the user equipment identity of the SIM card, changing an algorithm for determining a paging occasion based on the user equipment identity of the SIM card, providing a paging reason, and allowing the SIM card to be temporarily disconnected (e.g., allowing the SIM card to be temporarily disconnected from a radio resource control layer of the current base station).

In an embodiment, by exchanging the capability information for solving the multi-card communication conflict problem in the terminal with the base station, the core network can determine the way of the base station being able to solve the multi-card communication conflict problem in the terminal. When the terminal in communication with the core network needs to solve the multi-card communication conflict problem, the core network may determine a way of the terminal needing to solve the multi-card communication conflict problem, and determine whether the way of the terminal needing to solve the multi-card communication conflict problem belongs to the way of the base station being able to solve the multi-card communication conflict problem. If the way of the terminal needing to solve the multi-card communication conflict problem belongs to the way of the base station being able to solve the multi-card communication conflict problem, the core network can send the multi-card communication conflict problem that needs to be solved by the terminal to the base station, so that the base station can determine the solution in a corresponding way.

For example, the base station is capable of solving the multi-card communication conflict problem, and specific ways to solve the multi-card communication conflict problem include: changing a user equipment identity of a SIM card, providing an offset corresponding to the user equipment identity of the SIM card, and changing an algorithm for determining a paging occasion based on the user equipment identity of the SIM card.

For example, a way that the terminal needs to solve the multi-card communication conflict problem is changing the user equipment identity of the SIM card, the terminal may report the way of needing to solve the multi-card communication conflict problem to the core network via auxiliary information, and the core network may determine, based on the first capability information, that the base station is capable of solving the multi-card communication conflict problem in such way. The core network may send the multi-card communication conflict problem that needs to be solved by the terminal to the base station, the base station may determine the solution by changing the user equipment identity of the SIM card, and send the solution to the terminal after obtaining the solution, so as to collaborate with the base station in solving the communication conflict problem in the way desired by the terminal. Alternatively, the core network may instruct the base station to establish a communication connection with the terminal, the terminal may report the multi-card communication conflict problem to the base station via the communication connection, to obtain the solution from the base station.

In some embodiments, in response to the capability information for solving the multi-card communication conflict problem in the terminal including being capable of solving the multi-card communication conflict problem in the terminal, the capability information for solving the multi-card communication conflict problem in the terminal is further configured to indicate a type of the multi-card communication conflict problem in the terminal that is able to be solved.

In some embodiments, the type includes at least one of:
a conflict between monitoring a paging message by a first SIM card and monitoring a paging message by a second SIM card in the terminal;
a conflict between a communication operation of the first SIM card and the monitoring the paging message by the second SIM card in the terminal;
a conflict between the communication operation of the first SIM card and a response of the second SIM card to the paging message in the terminal;
a conflict between the communication operation of the first SIM card and measuring a signal by the second SIM card in the terminal;
a conflict between the communication operation of the first SIM card and receiving system information by the second SIM card in the terminal; and
a conflict between the communication operation of the first SIM card and updating a tracking area update by the second SIM card in the terminal.

In an embodiment, according to the first capability information, the core network may also determine the type of the multi-card communication conflict problem that is able to be solved by the base station. When the terminal in communication with the core network needs to solve the multi-card communication conflict problem, the core network may determine the type of the multi-card communication conflict problem that needs to be solved by the terminal, and determine whether the type of the multi-card communication conflict problem that needs to be solved by the terminal belongs to the type of the multi-card communication conflict problem that can be solved by the base station. If the type of the multi-card communication conflict problem that needs to be solved by the terminal belongs to the type of the multi-card communication conflict problem that can be solved by the base station, the core network may send the multi-card communication conflict problem that needs to be solved by the terminal to the base station, and the base station can determine the solution.

For example, the base station is capable of solving the multi-card communication conflict problem, and specific types of the multi-card communication conflict problems to be solved include: a conflict between monitoring a paging message by a first SIM card and monitoring a paging message by a second SIM card in the terminal, a conflict between a communication operation of the first SIM card and monitoring the paging message by the second SIM card in the terminal, and a conflict between the communication operation of the first SIM card and a response of the second SIM card to the paging message in the terminal.

For example, if the type of the multi-card communication conflict problem that needs to be solved by the terminal is the conflict between the monitoring the paging message by the first SIM card and the monitoring the paging message by the second SIM card in the terminal, the core network may determine that the base station is capable of solving such type of multi-card communication conflict problem, so that the core network sends the multi-card communication conflict problem that needs to be solved by the terminal to the base station, and the base station determines and sends the solution to the terminal after obtaining the solution. As such, the core network cooperates with the base station to solve the communication conflict problem for the terminal. Alternatively, the core network may instruct the base station to establish a communication connection with the terminal, so that the terminal can report the multi-card communication conflict problem to the base station based on the communication connection, to obtain the solution from the base station.

FIG. 2A is a flowchart illustrating another method for capability exchange according to an embodiment of the disclosure. As illustrated in FIG. 2A, in some embodiments, exchanging, with the core network, the capability information for solving the multi-card communication conflict problem in the terminal includes the following step.

At step S201, in response to setting up an interface with the core network, the capability information for solving the multi-card communication conflict problem in the terminal is exchanged with the core network.

In an embodiment, when the base station sets up an interface with the core network, the base station may exchange the capability information for solving the multi-card communication conflict problem in the terminal with the core network, so that the core network can determine the capability of the base station to solve the multi-card communication conflict problem in time.

In an embodiment, exchanging, with the core network, the capability information for solving the multi-card communication conflict problem in the terminal, includes:

sending first capability information to the core network, in which the first capability information is configured to indicate the capability of the base station to solve the multi-card communication conflict problem in the terminal.

In an embodiment, the first capability information is carried in an interface setup request signaling.

In an embodiment, the base station may send the interface a setup request signaling to the core network to set up an interface with the core network, and may carry the first capability information in the interface setup request signaling, which expands the function of the signaling and improves the utilization of the signaling.

It should be noted that the base station may also send the first capability information to the core network via the interface after the interface with the core network is set up.

In an embodiment, the base station may be a base station in a New Radio (NR) system, the interface between the base station and the core network may be a next generation (NG) interface, and the interface setup request signaling may be a NG application protocol (NGAP) signaling, the base station may send the signaling to an Access and Mobility Management Function (AMF) of the core network.

For example, the Table shown in FIG. 2B is the NG interface setup request signaling, in which a new information element (IE) can be set or an existing IE can also be reused to indicate the capability of the base station to solve the multi-card communication conflict, such as the IE of "Supported MUSIM Capabilities" in the Table shown in FIG. 2B. In an embodiment, the base station may be a base station in an UMTS Terrestrial Radio Access Network (E-UTRAN) system, the interface between the base station and the core network may be a S1 interface, and the interface setup request signaling may be a S1AP signaling, the base station may send the signaling to the AMF of the core network.

For example, the Table shown in FIG. 2C is a S1 interface setup request signaling, a new IE can be set or an existing IE can be reused to indicate the capability of the base station to solve the multi-card communication conflict (which can also include the capabilities of other base stations connected to the base station to solve the multi-card communication conflict), such as the IE of "Supported MUSIM Capabilities" in the Table shown in FIG. 2C. Further, a new IE may be added to the IE of "Connected en-gNB List" of the S1 interface setup request signaling, to indicate the capabilities for being able to solve the multi-card problem supported by other base stations connected to the base station, such as the IE of "Supported MUSIM Capabilities" in the Connected en-gNB List in the Table shown in FIG. 2D. In an embodiment, the first capability information is also used to indicate the capabilities of other base stations connected to the base station to solve the multi-card communication conflict problem in the terminal, so that the core network can determine the capabilities of more base stations to solve the multi-card communication conflict problem based on the first capability information, thus improving the communication efficiency.

FIG. 3 is a flowchart illustrating another method for capability exchange according to an embodiment of the disclosure. As illustrated in FIG. 3, in some embodiments, the method further includes the following step.

At step S301, an interface setup failure signaling sent by the core network is received, in which the interface setup failure signaling carries an interface setup failure reason that a capability of the core network to solve the multi-card communication conflict problem in the terminal is different from the capability of the base station to solve the multi-card communication conflict problem in the terminal.

In an embodiment, after receiving the interface setup request signaling, the core network may obtain the first capability information from the interface setup request signaling, and determine the capability of the base station to solve the multi-card communication conflict problem based on the first capability information.

Further, the core network may determine whether its own capability to solve the multi-card communication conflict problem is identical to the capability of the base station to solve the multi-card communication conflict problem. If the two capabilities are different, some problems may occur when the core network collaborates with the base station to solve the multi-card communication conflict problem. For example, in a case that the core network is able to solve a certain multi-card communication conflict problem, but the base station is not able to solve such multi-card communication conflict problem, even if the core network sets up an interface with the base station, the core network still cannot collaborate with the base station to solve the multi-card communication conflict problem, which leads to a waste of resources for setting up the interface.

Therefore, when the capability of the core network to solve the multi-card communication conflict problem is different from the capability of the base station to solve the multi-card communication conflict problem, the core network sends an interface setup failure signaling to the base station, so that an interface is not set up between the core network and the base station, thus avoiding the waste of resources for setting up the interface.

Moreover, it is also possible to carry the interface setup failure reason in the interface setup failure signaling. In detail, the reason is that the capability of the core network to solve the multi-card communication conflict problem in the terminal is different from the capability of the base station to solve the multi-card communication conflict problem in the terminal, so that the base station determines why setting up the interface with the core network is failed.

FIG. 4 is a flowchart illustrating another method for capability exchange according to an embodiment of the disclosure. As illustrated in FIG. 4, in some embodiments, the method further includes the following step.

At step S401, in response to an update of the first capability information, updated first capability information is sent to the core network via the interface with the core network.

In an embodiment, the capability of the base station to solve the multi-card communication conflict problem may change. After the capability of the base station to solve the multi-card communication conflict problem is changed, the first capability information may be updated and the updated first capability information is then sent to the core network via the interface between the base station and the core network, so that the core network can accurately determine the capability of the current base station to solve the multi-card communication conflict problem.

FIG. 5A is a flowchart illustrating another method for capability exchange according to an embodiment of the disclosure. As illustrated in FIG. 5A, in some embodiments, exchanging, with the core network, the capability information for solving the multi-card communication conflict problem in the terminal includes the following step.

At step S501, second capability information sent by the core network is received, in which the second capability information is configured to indicate the capability of the core network to solve the multi-card communication conflict problem in the terminal.

In an embodiment, the core network determines its own capability to solve the multi-card communication conflict problem in the terminal, generates the second capability information based on its own capability to solve the multi-card communication conflict problem in the terminal, and sends the second capability information to the base station, so that the base station may determine the capability of the core network to solve the multi-card communication conflict problem based on the second capability information.

In an embodiment, after determining the capability of the core network to solve the multi-card communication conflict problem, the base station can cooperate with the core network to solve the multi-card communication conflict problem in the terminal. For example, if there is a multi-card communication conflict problem in the terminal having a communication connection with the base station, but the base station cannot solve this multi-card communication conflict problem by itself, the base station determines that the core network can solve the multi-card communication conflict problem based on the second capability information, and sends the multi-card communication conflict problem to the core network, or instruct the terminal to send the multi-card communication conflict problem to the core network to obtain the solution from the core network, thus ensuring to successfully solve the multi-card communication conflict problem.

In some embodiments, the second capability information is carried in an interface setup response signaling.

The core network may send the interface setup response signaling to the base station to set up an interface with the base station, and may carry the second capability information in the interface setup response signaling, to expand the function of the signaling and improve the utilization of the signaling.

It is noted that the core network may also send the second capability information to the base station via the interface after setting up the interface with the base station.

In an embodiment, the core network may be a core network in a NR system, the interface between the base station and the core network may be a NG interface, and the interface setup response signaling may be a NGAP signaling, the core network can send the signaling to the base station.

For example, the Table of FIG. 5B shows a NG interface setup response signaling, a new IE can be set or an existing IE can be reused to indicate the capability of the core network to solve the multi-card communication conflict, such as the IE of "Supported MUSIM Capabilities" in the Table shown in FIG. 5B.

In an embodiment, the core network may be a core network in an E-UTRAN system, the interface between the base station and the core network may be a S1 interface, and the interface setup response signaling may be a S1AP signaling, the core network may send the signaling to the base station.

For example, the Table of FIG. 5C shows a S1 interface setup response signaling, a new IE can be set or an existing IE can be reused to indicate the capability of the core network to solve the multi-card communication conflict, such as the IE of "Supported MUSIM Capabilities" in the Table shown in FIG. 5C.

FIG. 6 is a flowchart illustrating another method for capability exchange according to an embodiment of the disclosure. As illustrated in FIG. 6, in some embodiments, the method further includes the following step.

At step S601, updated second capability information sent by the core network is received via the interface with the core network.

In an embodiment, the capability of the core network to solve the multi-card communication conflict problem may change. After the capability of the core network to solve the multi-card communication conflict problem is changed, the second capability information may be updated and the updated second capability information is sent to the base station via the interface between the base station and the core network, so that the base station can accurately determine the capability of the current core network to solve the multi-card communication conflict problem.

FIG. 7 is a flowchart illustrating another method for capability exchange according to an embodiment of the disclosure. The method for capability exchange shown in this embodiment may be applicable to a core network. The core network can communicate with a terminal and a base station. The terminal includes but is not limited to, electronic devices such as a cell phone, a tablet computer, a wearable device, a sensor, and an IoT device. The base station includes but is not limited to, base stations in a communication system such as a 4G base station, a 5G base station, and a 6G base station. The core network includes but is not limited to, core networks in the communication system such as a 4G core network, a 5G core network, and a 6G core network.

As illustrated in FIG. 7, the method further includes the following step.

At step S701, capability information for solving a multi-card communication conflict problem in a terminal is exchanged with a base station.

In an embodiment, multiple SIM cards may be set in the terminal, such as USIM cards. The SIM cards may be traditional SIM cards or eSIM cards, i.e., embedded SIM cards. The multiple SIM cards may belong to the same operator network, or may belong to different operator networks.

When the terminal uses the multiple SIM cards, communication conflict may occur between the multiple SIM cards. The terminal can send a communication conflict problem to the base station, and the base station can determine a solution. The multi-card communication conflict problem may refer to the problem caused by a communication conflict between two or more SIM cards, and the multiple SIM cards described below mainly includes a first SIM card and a second SIM card.

It should be noted that the first SIM card and the second SIM card do not refer to two specific SIM cards in the terminal, but generally refer to any two different SIM cards in the terminal.

In an embodiment, the base station may determine its own capability to solve the multi-card communication conflict problem in the terminal, so that the base station may generate the first capability information based on its own capability of solving the multi-card communication conflict problem in the terminal, and send the first capability information to the core network, so as to exchange with the core network, the capability information for solving the multi-card communication conflict problem in the terminal.

The base station exchanges the capability information for solving the multi-card communication conflict problem in the terminal with the core network, which includes sending the first capability information to the core network, and receiving second capability information sent by the core network. The second capability information is configured to indicate a capability of the core network to solve the multi-card communication conflict problem in the terminal.

On the basis, the core network may determine the capability of the base station to solve the multi-card communication conflict problem in the terminal, and the base station may determine the capability of the core network to solve the multi-card communication conflict problem in the terminal, so that the core network may cooperate with the base station in resolving the communication conflict problem in the terminal in a more comprehensive manner.

In addition, the base station may determine capabilities of other base stations connected to the base station to solve the multi-card communication conflict problem in the terminal. The first capability information indicates both the capability of the base station to solve the multi-card communication conflict problem in the terminal and the capabilities of other base stations connected to the base station to solve the multi-card communication conflict problem in the terminal.

In some embodiments, the capability information for solving the multi-card communication conflict problem in the terminal includes one of:

being capable of solving the multi-card communication conflict problem in the terminal, and being incapable of solving the multi-card communication conflict problem in the terminal.

In an embodiment, the capabilities of different base stations to solve the multi-card communication conflict problem may be different. Roughly speaking, the capability of solving the multi-card communication conflict problem includes: being capable of solving the multi-card communication conflict problem, and being incapable of solving the multi-card communication conflict problem. In detail, the capability of solving the communication conflict problem can be as specific as a way of solving the communication conflict problem, a type of the communication conflict to be solved, and so on.

In an embodiment, for example, the base station is capable of solving the multi-card communication conflict problem, and the core network is incapable of solving the multi-card communication conflict problem.

By exchanging the capability information for solving the multi-card communication conflict problem in the terminal with the base station, the core network may determine that the base station is capable of solving the multi-card communication conflict problem. When the terminal in communication with the core network needs to solve the multi-card communication conflict problem, the core network may send the multi-card communication conflict problem to be solved by the terminal to the base station, so that the base station may determine the solution and send the solution to the terminal after obtaining the solution. As such, the core network cooperates with the base station to solve the communication conflict problem for the terminal. Alternatively, the core network may instruct the base station to establish a communication connection with the terminal, so that the terminal may report the multi-card communication conflict problem to the base station via the communication connection, to obtain the solution from the base station.

In some embodiments, in response to the capability information for solving the multi-card communication conflict problem in the terminal including being capable of solving the multi-card communication conflict problem in the terminal, the capability information for solving the multi-card communication conflict problem in the terminal is further configured to indicate a way to solve the multi-card communication conflict problem in the terminal.

In some embodiments, the way includes at least one of:

changing a user equipment identity of a SIM card, providing an offset corresponding to the user equipment identity of the SIM card, changing an algorithm for determining a paging occasion based on the user equipment identity of the SIM card, providing a paging reason, and allowing the SIM card to be temporarily disconnected.

In an embodiment, by exchanging the capability information for solving the multi-card communication conflict problem in the terminal with the base station, the core network can determine the way of the base station being able to solve the multi-card communication conflict problem in the terminal. When the terminal in communication with the core network needs to solve the multi-card communication conflict problem, the core network may determine a way of the terminal needing to solve the multi-card communication conflict problem, and determine whether the way of the terminal needing to solve the multi-card communication conflict problem belongs to the way of the base station being able to solve the multi-card communication conflict problem. If the way of the terminal needing to solve the multi-card communication conflict problem belongs to the way of the base station being able to solve the multi-card communication conflict problem, the core network can send the multi-card communication conflict problem that needs to be solved by the terminal to the base station, so that the base station can determine the solution in a corresponding way.

For example, the base station is capable of solving the multi-card communication conflict problem, and specific ways to solve the multi-card communication conflict problem include: changing a user equipment identity of a SIM card, providing an offset corresponding to the user equipment identity of the SIM card, and changing an algorithm for determining a paging occasion based on the user equipment identity of the SIM card.

For example, a way that the terminal needs to solve the multi-card communication conflict problem is changing the user equipment identity of the SIM card, the terminal may report the way of needing to solve the multi-card communication conflict problem to the core network via auxiliary information, and the core network may determine, based on the first capability information, that the base station is capable of solving the multi-card communication conflict problem in such way. The core network may send the multi-card communication conflict problem that needs to be solved by the terminal to the base station, the base station may determine the solution by changing the user equipment identity of the SIM card, and send the solution to the terminal after obtaining the solution, so as to collaborate with the base station in solving the communication conflict problem in the way desired by the terminal. Alternatively, the core network may instruct the base station to establish a communication connection with the terminal, the terminal may report the multi-card communication conflict problem to the base station via the communication connection, to obtain the solution from the base station.

In some embodiments, in response to the capability information for solving the multi-card communication conflict problem in the terminal including the capability of solving the multi-card communication conflict problem in the terminal, the capability information for solving the multi-card communication conflict problem in the terminal is further configured to indicate a type of the multi-card communication conflict problem in the terminal that is able to be solved.

In some embodiments, the type includes at least one of:
a conflict between monitoring a paging message by a first SIM card and monitoring a paging message by a second SIM card in the terminal;
a conflict between a communication operation of the first SIM card and the monitoring the paging message by the second SIM card in the terminal;
a conflict between the communication operation of the first SIM card and a response of the second SIM card to the paging message in the terminal;
a conflict between the communication operation of the first SIM card and measuring a signal by the second SIM card in the terminal;
a conflict between the communication operation of the first SIM card and receiving system information by the second SIM card in the terminal; and
a conflict between the communication operation of the first SIM card and updating a tracking area update by the second SIM card in the terminal.

In an embodiment, according to the first capability information, the core network may also determine the type of the multi-card communication conflict problem that is able to be solved by the base station. When the terminal in communication with the core network needs to solve the multi-card communication conflict problem, the core network may determine the type of the multi-card communication conflict problem that needs to be solved by the terminal, and determine whether the type of the multi-card communication conflict problem that needs to be solved by the terminal belongs to the type of the multi-card communication conflict problem that can be solved by the base station. If the type of the multi-card communication conflict problem that needs to be solved by the terminal belongs to the type of the multi-card communication conflict problem that can be solved by the base station, the core network may send the multi-card communication conflict problem that needs to be solved by the terminal to the base station, and the base station can determine the solution.

For example, the base station is capable of solving the multi-card communication conflict problem, and specific types of the multi-card communication conflict problems to be solved include: a conflict between monitoring a paging message by a first SIM card and monitoring a paging message by a second SIM card in the terminal, a conflict between a communication operation of the first SIM card and monitoring the paging message by the second SIM card in the terminal, and a conflict between the communication operation of the first SIM card and a response of the second SIM card to the paging message in the terminal.

For example, if the type of the multi-card communication conflict problem that needs to be solved by the terminal is the conflict between monitoring the paging message by the first SIM card and monitoring the paging message by the second SIM card in the terminal, the core network may determine that the base station is capable of solving such type of multi-card communication conflict problem, so that the core network sends the multi-card communication conflict problem that needs to be solved by the terminal to the base station, and the base station determines and sends the solution to the terminal after obtaining the solution. As such, the core network cooperates with the base station to solve the communication conflict problem for the terminal. Alternatively, the core network may instruct the base station to establish a communication connection with the terminal, so that the terminal can report the multi-card communication conflict problem to the base station based on the communication connection, to obtain the solution from the base station.

FIG. 8 is a flowchart illustrating another method for capability exchange according to an embodiment of the disclosure. As illustrated in FIG. 8, in some embodiments, exchanging, with the base station, the capability information for solving the multi-card communication conflict problem in the terminal includes the following step.

At step S801, in response to setting up an interface with the base station, the capability information for solving the multi-card communication conflict problem in the terminal is exchanged with the base station.

In an embodiment, when the core network sets up an interface with the base station, the core network may exchange the capability information for solving the multi-card communication conflict problem in the terminal with the base station, so that the base station can determine the capability of the core network to solve the multi-card communication conflict problem in time.

In an embodiment, exchanging, with the base station, the capability information for solving the multi-card communication conflict problem in the terminal, includes:
receiving first capability information sent by the base station, in which the first capability information is configured to indicate the capability of the base station to solve the multi-card communication conflict problem in the terminal.

In an embodiment, the first capability information is carried in an interface setup request signaling.

In an embodiment, the base station may send the interface setup request signaling to the core network to set up an interface with the core network, and may carry the first capability information in the interface setup request signaling, which expands the function of the signaling and improves the utilization of the signaling.

It should be noted that the base station may also send the first capability information to the core network via the interface after the interface with the core network is set up.

In an embodiment, the base station may be a base station in a NR system, the interface between the base station and the core network may be a NG interface, and the interface setup request signaling may be a NGAP signaling, the base station may send the signaling to the AMF of the core network.

For example, the Table shown in FIG. 2B is the NG interface setup request signaling, a new IE can be set or an existing IE can be reused to indicate the capability of the base station to solve the multi-card communication conflict, such as the IE of "Supported MUSIM Capabilities" in the Table shown in FIG. 2B.

In an embodiment, the base station may be a base station in an E-UTRAN system, the interface between the base station and the core network may be a S1 interface, and the interface setup request signaling may be a S1AP signaling, the base station may send the signaling to the AMF of the core network.

For example, the Table shown in FIG. 2C is a S1 interface setup request signaling, a new IE can be set or an existing IE can be reused to indicate the capability of the base station to solve the multi-card communication conflict (which can also include the capabilities of other base stations connected to the base station to solve the multi-card communication conflict), such as the IE of "Supported MUSIM Capabilities" in the Table shown in FIG. 2C.

Further, a new IE may be added to the IE of "Connected en-gNB List" of the S1 interface setup request signaling, to indicate the capabilities for being able to solve the multi-card problem supported by other base stations connected to the base station, such as the IE of "Supported MUSIM Capabilities" in the Connected en-gNB List in the Table shown in FIG. 2D.

In an embodiment, the first capability information is also used to indicate the capabilities of other base stations connected to the base station to solve the multi-card communication conflict problem in the terminal, so that the core network can determine the capabilities of more base stations to solve the multi-card communication conflict problem based on the first capability information, thus improving the communication efficiency.

FIG. 9 is a flowchart illustrating another method for capability exchange according to an embodiment of the disclosure. As illustrated in FIG. 9, in some embodiments, the method further includes the following step.

At step S901, in response to a capability of the core network to solve the multi-card communication conflict problem in the terminal being different from the capability of the base station to solve the multi-card communication conflict problem in the terminal, an interface setup failure signaling is sent to the base station.

In an embodiment, after receiving the interface setup request signaling, the core network may obtain the first capability information from the interface setup request signaling, and determine the capability of the base station to solve the multi-card communication conflict problem based on the first capability information.

Further, the core network may determine whether its own capability to solve the multi-card communication conflict problem is identical to the capability of the base station to solve the multi-card communication conflict problem. If the two capabilities are different, some problems may occur when the core network collaborates with the base station to solve the multi-card communication conflict problem. For example, in a case that the core network is able to solve a certain multi-card communication conflict problem, but the base station is not able to solve such multi-card communication conflict problem, even if the core network sets up an interface with the base station, the core network still cannot collaborate with the base station to solve the multi-card communication conflict problem, which leads to a waste of resources for setting up the interface.

Therefore, when the capability of the core network to solve the multi-card communication conflict problem is different from the capability of the base station to solve the multi-card communication conflict problem, the core network sends an interface setup failure signaling to the base station, so that an interface is not set up between the core network and the base station, thus avoiding the waste of resources for setting up the interface.

In addition, it is also possible to carry the interface setup failure reason in the interface setup failure signaling. In detail, the reason is that the capability of the core network to solve the multi-card communication conflict problem in the terminal is different from the capability of the base station to solve the multi-card communication conflict problem in the terminal, so that the base station determines why the setup of the interface with the core network is failed.

FIG. 10 is a flowchart illustrating another method for capability exchange according to an embodiment of the disclosure. As illustrated in FIG. 10, in some embodiments, exchanging, with the base station, the capability information for solving the multi-card communication conflict problem in the terminal includes the following step.

At step S1001, second capability information is sent to the base station, in which the second capability information is configured to indicate the capability of the core network to solve the multi-card communication conflict problem in the terminal.

In an embodiment, the core network determines its own capability to solve the multi-card communication conflict problem in the terminal, generates the second capability information based on its own capability to solve the multi-card communication conflict problem in the terminal, and sends the second capability information to the base station, so that the base station may determine the capability of the core network to solve the multi-card communication conflict problem based on the second capability information.

In an embodiment, after determining the capability of the core network to solve the multi-card communication conflict problem, the base station can cooperate with the core network to solve the multi-card communication conflict problem in the terminal. For example, if there is a multi-card communication conflict problem in the terminal having a communication connection with the base station, but the base station cannot solve this multi-card communication conflict problem by itself, the base station determines that the core network can solve the multi-card communication conflict problem based on the second capability information, and sends the multi-card communication conflict problem to the core network, or instruct the terminal to send the multi-card communication conflict problem to the core network to obtain the solution from the core network, thus ensuring to successfully solve the multi-card communication conflict problem.

In some embodiments, the second capability information is carried in an interface setup response signaling.

The core network may send the interface setup response signaling to the base station to establish an interface with the base station, and may carry the second capability information in the interface setup response signaling, to expand the function of the signaling and improve the utilization of the signaling.

It is noted that the core network may also send the second capability information to the base station via the interface after setting up the interface with the base station.

In an embodiment, the core network may be a core network in a NR system, the interface between the base station and the core network may be a NG interface, and the interface setup response signaling may be a NGAP signaling, the core network can send the signaling to the base station.

For example, the Table of FIG. 5B shows a NG interface setup response signaling, a new IE can be set or an existing IE can be reused to indicate the capability of the core network to solve the multi-card communication conflict, such as the IE of "Supported MUSIM Capabilities" in the Table shown in FIG. 5B.

In an embodiment, the core network may be a core network in an E-UTRAN system, the interface between the base station and the core network may be a S1 interface, and the interface setup response signaling may be a S1AP signaling, the core network may send the signaling to the base station.

For example, the Table of FIG. 5C shows a S1 interface setup response signaling, a new IE can be set or an existing IE can be reused to indicate the capability of the core network to solve the multi-card communication conflict, such as the IE of "Supported MUSIM Capabilities" in the Table shown in FIG. 5C.

FIG. 11 is a flowchart illustrating another method for capability exchange according to an embodiment of the disclosure. As illustrated in FIG. 11, in some embodiments, the method further includes the following step.

At step S1101, in response to an update of the second capability information, updated second capability information is sent to the base station via the interface with the base station.

In an embodiment, the capability of the core network to solve the multi-card communication conflict problem may change. After the capability of the core network to solve the multi-card communication conflict problem is changed, the second capability information may be updated and the updated second capability information is sent to the base station via the interface between the base station and the core network, so that the base station can accurately determine the capability of the current core network to solve the multi-card communication conflict problem.

The disclosure also provides a method for exchange triggering, which is applied to a terminal. The method includes:

in response to a multi-card communication conflict, sending a multi-card communication conflict problem to a base station to trigger the base station to execute the steps in the method for capability exchange according to any of the above embodiments, and/or sending a multi-card communication conflict problem to a core network to trigger the core network to execute the steps in the method for capability exchange according to any of the above embodiments.

It is noted that the base station may also spontaneously execute the steps in the method for capability exchange described in any of the foregoing embodiments as needed, and the core network may also spontaneously execute the steps in the method for capability exchange described in any of the foregoing embodiments as needed.

Corresponding to the method for capability exchange of the embodiments of the disclosure, the disclosure also provides the embodiments of the apparatus for capability exchange.

FIG. 12 is a schematic diagram illustrating an apparatus for capability exchange according to an embodiment of the disclosure. The apparatus for capability exchange is applied to a base station. The base station can communicate with a terminal and a core network. The terminal includes but is not limited to, electronic devices such as a cell phone, a tablet computer, a wearable device, a sensor, and an IoT device. The base station includes but is not limited to, base stations in a communication system such as a 4G base station, a 5G base station, and a 6G base station. The core network includes but is not limited to, core networks in a communication system such as a 4G core network, a 5G core network, and a 6G core network.

As illustrated in FIG. 12, the apparatus for capability exchange includes:

a capability exchange module 1201, configured to exchange, with a core network, capability information for solving a multi-card communication conflict problem in a terminal.

In some embodiments, the capability information for solving the multi-card communication conflict problem in the terminal includes one of:

being capable of solving the multi-card communication conflict problem in the terminal, and being incapable of solving the multi-card communication conflict problem in the terminal.

In some embodiments, in response to the capability information for solving the multi-card communication conflict problem in the terminal including being capable of solving the multi-card communication conflict problem in the terminal, the capability information for solving the multi-card communication conflict problem in the terminal is further configured to indicate a way that the multi-card communication conflict problem in the terminal is able to be solved.

In some embodiments, the way includes at least one of:

changing a user equipment identity of a SIM card, providing an offset corresponding to the user equipment identity of the SIM card, changing an algorithm for determining a paging occasion based on the user equipment identity of the SIM card, providing a paging reason, and allowing the SIM card to be temporarily disconnected.

In some embodiments, in response to the capability information for solving the multi-card communication conflict problem in the terminal including being capable of solving the multi-card communication conflict problem in the terminal, the capability information for solving the multi-card communication conflict problem in the terminal is further configured to indicate a type of the multi-card communication conflict problem in the terminal that is able to be solved.

In some embodiments, the type includes at least one of:

a conflict between monitoring a paging message by a first SIM card and monitoring a paging message by a second SIM card in the terminal;

a conflict between a communication operation of the first SIM card and monitoring the paging message by the second SIM card in the terminal;

a conflict between the communication operation of the first SIM card and a response of the second SIM card to the paging message in the terminal;

a conflict between the communication operation of the first SIM card and measuring a signal by the second SIM card in the terminal;

a conflict between the communication operation of the first SIM card and receiving system information by the second SIM card in the terminal; and a conflict between the communication operation of the first SIM card and updating a tracking area by the second SIM card in the terminal.

In some embodiments, the capability exchange module 1201 is configured to: in response to setting up an interface with the core network, exchange, with the core network, the capability information for solving the multi-card communication conflict problem in the terminal.

In some embodiments, the capability exchange module 1201 is configured to: send first capability information to the core network, in which the first capability information is configured to indicate the capability of the base station to solve the multi-card communication conflict problem in the terminal.

In some embodiments, the first capability information is carried in an interface setup request signaling.

In some embodiments, the first capability information is further configured to indicate capabilities of other base stations connected to the base station to solve the multi-card communication conflict problem in the terminal.

FIG. 13 is a schematic diagram illustrating an apparatus for capability exchange according to an embodiment of the disclosure. As illustrated in FIG. 13, in some embodiments, the apparatus further includes:

a failure receiving module 1301, configured to receive an interface setup failure signaling sent by the core network, in which the interface setup failure signaling carries an interface setup failure reason that a capability of the core network to solve the multi-card communication conflict problem in the terminal is different from the capability of the base station to solve the multi-card communication conflict problem in the terminal.

FIG. 14 is a schematic diagram illustrating an apparatus for capability exchange according to an embodiment of the disclosure. As illustrated in FIG. 14, in some embodiments, the apparatus further includes:

an update sending module 1401, configured to, in response to an update of the first capability information, send updated first capability information to the core network via the interface with the core network.

In some embodiments, the capability exchange module 1201 is configured to: receive second capability information sent by the core network, in which the second capability information is configured to indicate a capability of the core network to solve the multi-card communication conflict problem in the terminal.

In some embodiments, the second capability information is carried in an interface setup response signaling.

FIG. 15 is a schematic diagram illustrating an apparatus for capability exchange according to an embodiment of the disclosure. As illustrated in FIG. 14, in some embodiments, the apparatus further includes:

an update receiving module 1501, configured to receive updated second capability information sent by the core network via the interface with the core network.

Figure 16:
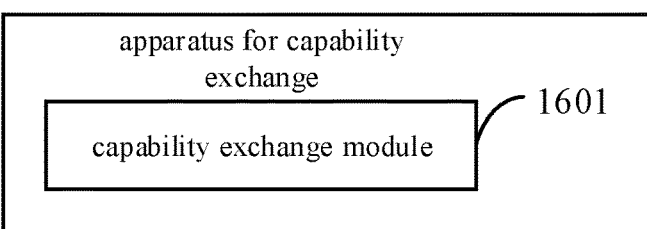
FIG. 16 is a schematic diagram illustrating an apparatus for capability exchange according to an embodiment of the disclosure.

FIG. 16 is a schematic diagram illustrating an apparatus for capability exchange according to an embodiment of the disclosure. The apparatus for capability exchange is applied to a core network. The core network can communicate with a terminal and a base station. The terminal includes but is not limited to, electronic devices such as a cell phone, a tablet computer, a wearable device, a sensor, and an IoT device. The base station includes but is not limited to, base stations in a communication system such as a 4G base station, a 5G base station, and a 6G base station. The core network includes but is not limited to, core networks in a communication system such as a 4G core network, a 5G core network, and a 6G core network.

As illustrated in FIG. 16, the apparatus for capability exchange includes:

a capability exchanging module 1601, configured to exchange, with a base station, capability information for solving a multi-card communication conflict problem in a terminal.

In some embodiments, the capability information for solving the multi-card communication conflict problem in the terminal includes one of:

being capable of solving the multi-card communication conflict problem in the terminal, and being incapable of solving the multi-card communication conflict problem in the terminal.

In some embodiments, in response to the capability information for solving the multi-card communication conflict problem in the terminal including being capable of solving the multi-card communication conflict problem in the terminal, the capability information for solving the multi-card communication conflict problem in the terminal is further configured to indicate a way that the multi-card communication conflict problem in the terminal is able to be solved.

In some embodiments, the way includes at least one of:

changing a user equipment identity of a SIM card, providing an offset corresponding to the user equipment identity of the SIM card, changing an algorithm for determining a paging occasion based on the user equipment identity of the SIM card, providing a paging reason, and allowing the SIM card to be temporarily disconnected.

In some embodiments, in response to the capability information for solving the multi-card communication conflict problem in the terminal including being capable of solving the multi-card communication conflict problem in the terminal, the capability information for solving the multi-card communication conflict problem in the terminal is further configured to indicate a type of the multi-card communication conflict problem in the terminal that is able to be solved.

In some embodiments, the type includes at least one of:

a conflict between monitoring a paging message by a first SIM card and monitoring a paging message by a second SIM card in the terminal;

a conflict between a communication operation of the first SIM card and the monitoring the paging message by the second SIM card in the terminal;

a conflict between the communication operation of the first SIM card and a response of the second SIM card to the paging message in the terminal;

a conflict between the communication operation of the first SIM card and measuring a signal by the second SIM card in the terminal;

a conflict between the communication operation of the first SIM card and receiving system information by the second SIM card in the terminal; and a conflict between the communication operation of the first SIM card and updating a tracking area by the second SIM card in the terminal.

In some embodiments, the capability exchanging module 1601 is configured to: in response to setting up an interface with the base station, exchange, with the base station, the capability information for solving the multi-card communication conflict problem in the terminal.

In some embodiments, the capability exchanging module 1601 is configured to: receive first capability information sent by the base station, in which the first capability information is configured to indicate the capability of the base station to solve the multi-card communication conflict problem in the terminal.

In some embodiments, the first capability information is carried in an interface setup request signaling.

In some embodiments, the first capability information is further configured to indicate capabilities of other base stations connected to the base station to solve the multi-card communication conflict problem in the terminal.

Figure 17:
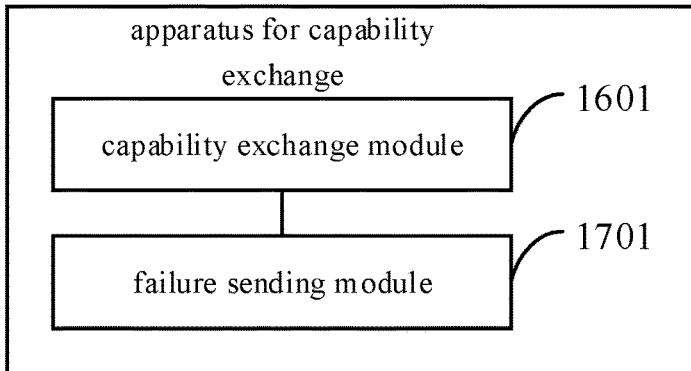
FIG. 17 is a schematic diagram illustrating another apparatus for capability exchange according to an embodiment of the disclosure.

FIG. 17 is a schematic diagram illustrating an apparatus for capability exchange according to an embodiment of the disclosure. As illustrated in FIG. 17, in some embodiments, the apparatus further includes:

a failure sending module 1701, configured to, in response to a capability of the core network to solve the multi-card communication conflict problem in the terminal being different from the capability of the base station to solve the multi-card communication conflict problem in the terminal, send an interface setup failure signaling to the base station.

In some embodiments, the capability exchanging module 1601 is configured to: send second capability information to the base station, in which the second capability information is configured to indicate a capability of the core network to solve the multi-card communication conflict problem in the terminal.

In some embodiments, the second capability information is carried in an interface setup response signaling.

Figure 18:
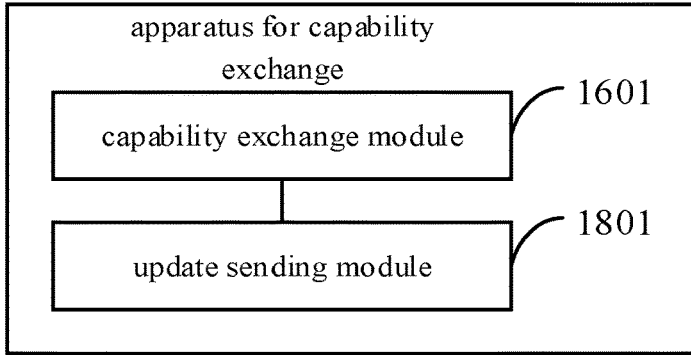
FIG. 18 is a schematic diagram illustrating another apparatus for capability exchange according to an embodiment of the disclosure.

FIG. 18 is a schematic diagram illustrating another apparatus for capability exchange according to an embodiment of the disclosure. As illustrated in FIG. 18, in some embodiments, the apparatus further includes:

an update sending module 1801, configured to, in response to an update of the second capability information, send updated second capability information to the base station via the interface with the base station.

The disclosure provides an exchange triggering apparatus, which is applied to a terminal. The apparatus includes:

a problem sending module, configured to, in response to a multi-card communication conflict, send a multi-card communication conflict problem to a base station to trigger the base station to execute the steps in the method for capability exchange according to any of the above embodiments, and/or sending a multi-card communication conflict problem to a core network to trigger the core network to execute the steps in the method for capability exchange according to any of the above embodiments.

With respect to the apparatus in the above embodiments, the specific manner in which each module performs an operation has been described in detail in the relevant method embodiments, and will not be described in detail herein.

Since the apparatus embodiments basically correspond to the method embodiments, the related contents can refer to a part of the descriptions of the method embodiments. The above-described apparatus embodiments are merely exemplary, the modules described above as separate components may or may not be physically separated, and the components displayed as modules may or may not be physical units, i.e., the components may be located in one area or may be distributed to multiple network modules. Some or all of these modules can be selected according to practical needs to achieve the purpose of the solution of the disclosure. Those skilled in the art can understand and implement the solution without inventive works.

The disclosure also provides a communication device. The communication device includes:

a processor;

a memory for storing instructions executable by the processor; in which the processor is configured to implement the method for capability exchange that is applicable to the base station according to any embodiment.

The disclosure also provides a communication device. The communication device includes:

a processor;

a memory for storing instructions executable by the processor; in which the processor is configured to implement the method for capability exchange that is applicable to the core network according to any embodiment.

The disclosure also provides a communication device. The communication device includes:

a processor;

a memory for storing instructions executable by the processor; in which the processor is configured to implement the method for exchange triggering.

The disclosure also provides a computer-readable storage medium having computer programs stored. When the programs are executed by a processor, the steps in the method for capability exchange that is applicable to the base station according to any embodiment are implemented.

The disclosure also provides a computer-readable storage medium having computer programs stored. When the programs are executed by a processor, the steps in the method for capability exchange that is applicable to the core network are implemented.

The disclosure also provides a computer-readable storage medium having computer programs stored. When the programs are executed by a processor, the steps in the method for exchange triggering are implemented.

Figure 19:
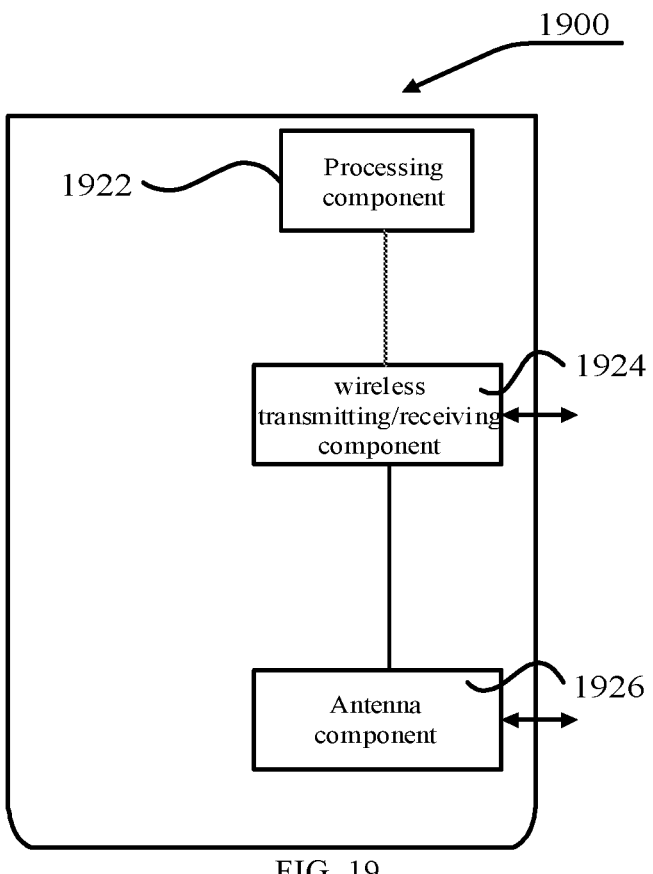
FIG. 19 is a block diagram illustrating a device for exchanging capability according to an embodiment of the disclosure.

As illustrated in FIG. 19, FIG. 19 is a block diagram illustrating a device 1900 for capability exchanging according to an embodiment of the disclosure. The device 1900 may be provided as a base station. As illustrated in FIG. 19, the device 1900 includes a processing component 1922, a wireless transmitting/receiving component 1924, an antenna component 1926, and a signal processing portion specific to the wireless interface. The processing component 1922 may further include one or more processors. One of the processors in the processing component 1922 may be configured to implement the method for capability exchange described in any of the above embodiments.

Figure 20:
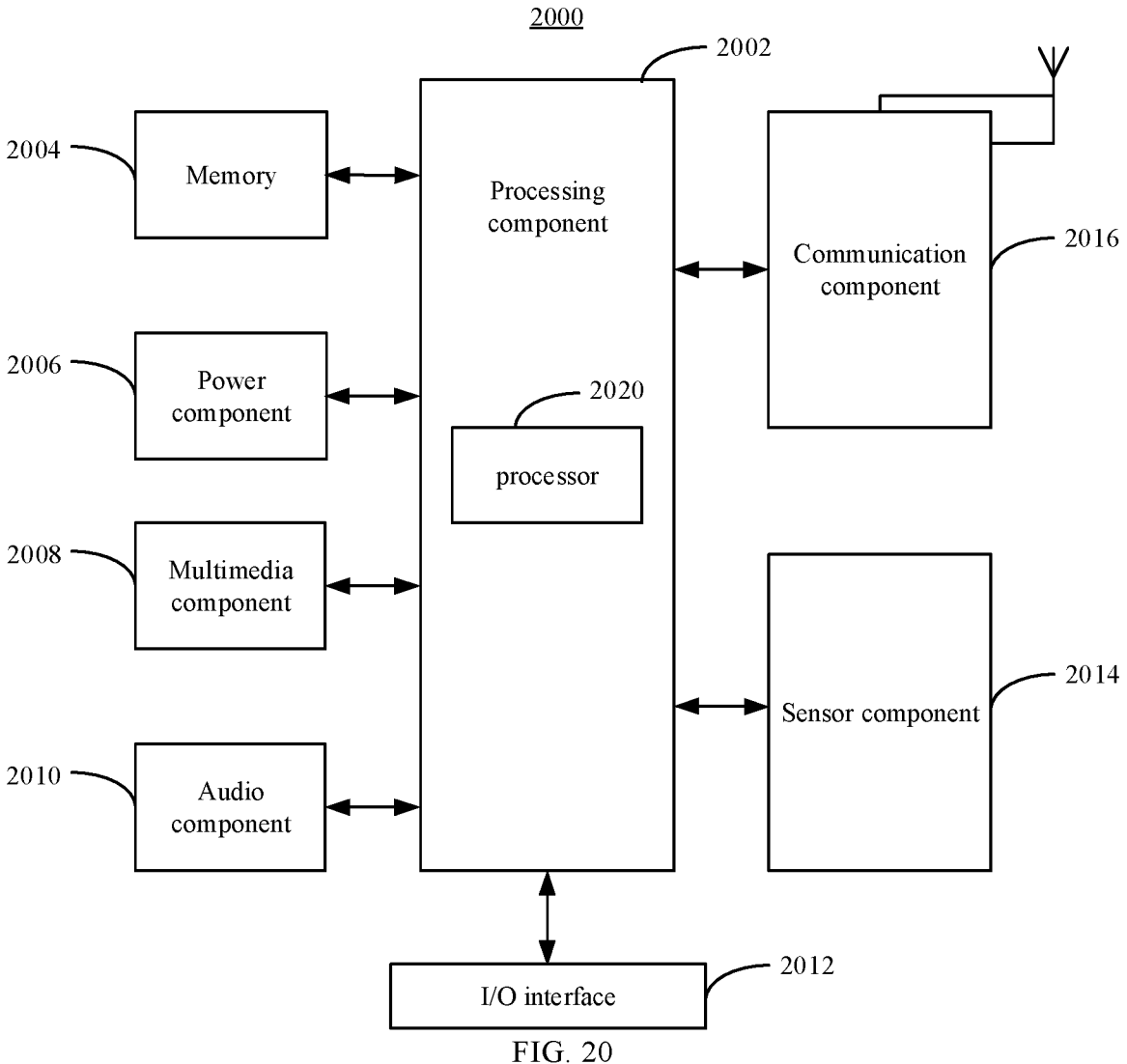
FIG. 20 is a block diagram illustrating a device for triggering exchange according to an embodiment of the disclosure.

FIG. 20 is a block diagram illustrating a device 2000 for exchange triggering according to an embodiment of the disclosure. For example, the device 2000 may be a cell phone, a computer, a digital broadcast terminal, a message transceiver device, a game console, a tablet device, a medical device, a fitness device, a personal digital assistant, and the like.

As illustrated in FIG. 20, the device 2000 may include one or more of the following components: a processing component 2002, a memory 2004, a power component 2006, a multimedia component 2008, an audio component 2010, an input/output (I/O) interface 2012, a sensor component 2014, and a communication component 2016.

The processing component 2002 typically controls overall operations of the device 2000, such as the operations associated with display, telephone calls, data communications, camera operations, and recording operations. The processing component 2002 may include one or more processors 2020 to perform all or part of the steps in the above described method. Moreover, the processing component 2002 may include one or more modules which facilitate the interaction between the processing component 2002 and other components. For example, the processing component 2002 may include a multimedia module to facilitate the interaction between the multimedia component 2008 and the processing component 2002.

The memory 2004 is configured to store various types of data to support the operation of the device 2000. Examples of such data include instructions for any applications or methods operated on the device 2000, contact data, phone-book data, messages, pictures, video, etc. The memory 2004 may be implemented using any type of volatile or non-volatile memory devices, or their combination, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 2006 provides power to various components of the device 2000. The power component 2006 may include a power management system, one or more power sources, and any other components associated with the generation, management, and distribution of power in the device 2000.

The multimedia component 2008 includes a screen providing an output interface between the device 2000 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2008 includes a front-facing camera and/or a rear-facing camera. When the device 2000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 2010 is configured to output and/or input audio signals. For example, the audio component 2010 includes a microphone (MIC) configured to receive an external audio signal when the device 2000 is in an operation mode, such as a calling mode, a recording mode, and a voice recognition mode. The received audio signal may be further stored in the memory 2004 or transmitted via the communication component 2016. In some embodiments, the audio component 2010 further includes a speaker to output audio signals.

The I/O interface 2012 provides an interface between the processing component 2002 and peripheral interface modules, such as a keyboard, a click wheel, buttons, and the like. The buttons may include, but are not limited to, a home button, a volume button, a starting button, and a locking button.

The sensor component 2014 includes one or more sensors to provide status assessments of various aspects of the device 2000. For instance, the sensor component 2014 may detect an open/closed status of the device 2000, relative positioning of components, e.g., the display and the keypad, of the device 2000, a change in position of the device 2000 or a component of the device 2000, a presence or absence of a user contact with the device 2000, an orientation or an acceleration/deceleration of the device 2000, and a change in temperature of the device 2000. The sensor component 2014 may include a proximity sensor configured to detect the presence of nearby objects without any physical contact. The sensor component 2014 may also include a light sensor, such as a Complementary Metal Oxide Semiconductor (CMOS) or Charge-Coupled Device (CCD) image sensor, for use in imaging applications. In some embodiments, the sensor component 2014 may also include an accelerometer sensor, a gyroscope sensor, a magnetic sensor, a pressure sensor, or a temperature sensor.

The communication component 2016 is configured to facilitate communication, wired or wirelessly, between the device 2000 and other devices. The device 2000 can access a wireless network based on a communication standard, such as WiFi, 2G, or 3G, 4G LTE, 5G NR or their combination. In an embodiment, the communication component 2016 receives a broadcast signal from an external broadcast management system or broadcast associated information via a broadcast channel. In an embodiment, the communication component 2016 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the embodiment, the device 2000 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), con-trollers, micro-controllers, microprocessors or other electronic components, for performing the above described method for exchange triggering.

In the embodiments, there is also provided a non-transitory computer readable storage medium including instructions, such as the memory 2004, executable by the processor 2020 in the device 2000, for implementing the above method for exchange triggering. For example, the non-transitory computer-readable storage medium may be a ROM, a Random Access Memory (RAM), a CD-ROM, a magnetic tape, a floppy disc, and an optical data storage device.

Other embodiments of the disclosure will be apparent to those skilled in the art from consideration of the specification and practice of the disclosure disclosed here. This disclosure is intended to cover any variations, uses, or adaptations of the disclosure following the general principles and including such departures from the disclosure as come within known or customary practice in the art. It is intended that the specification and examples are considered as exemplary only, with a true scope of the disclosure being indicated by the following claims.

It will be appreciated that the disclosure is not limited to the exact construction that has been described above and illustrated in the accompanying drawings, and that various modifications and changes can be made without departing from the scope. It is intended that the scope of the disclosure only be limited by the appended claims.

It should be noted that, in this disclosure, relational terms such as first and second are used only to distinguish one entity or operation from another, and do not necessarily require or imply the existence of any such actual relation or order between those entities or operations. The terms "including", "comprising", or any other variant, are intended to cover non-exclusive inclusion, so that a process, method, article or apparatus comprising a set of elements includes not only those elements, but also other elements that are not expressly enumerated, or elements that are inherent to such process, method, article or apparatus. Without further limitation, the fact that an element is defined by the phrase "including a" does not exclude the existence of another identical element in the process, method, article or apparatus that includes the element.

The above methods and apparatus according to the embodiments of the disclosure are described in detail in the embodiments of the disclosure, and specific examples are applied herein to illustrate the principles and implementations of the disclosure, and the above illustrations of the embodiments are only used to assist in the understanding the method of the disclosure and the core concept thereof. Meanwhile, for those skilled in the art, based on the concept of the disclosure, there will be changes in the specific implementations and the scope of disclosure. In conclusion, the contents of the specification should not be construed as a limitation on the disclosure.

What is claimed is:

1. A method for capability exchange, performed by a base station, the method comprising:

exchanging, with a core network, capability information for solving a multi-card communication conflict problem in a terminal; and receiving an interface setup failure signaling sent by the core network, wherein the interface setup failure signaling carries an interface setup failure reason that a capability of the core network to solve the multi-card communication conflict problem in the terminal is different from a capability of the base station to solve the multi-card communication conflict problem in the terminal;

wherein exchanging, with the core network, the capability information comprises:

sending first capability information to the core network, wherein the first capability information is configured to indicate the capability of the base station to solve the multi-card communication conflict problem in the terminal.

2. The method of claim 1, wherein the capability information indicates one of:

being capable of solving the multi-card communication conflict problem in the terminal, and being incapable of solving the multi-card communication conflict problem in the terminal.

3. The method of claim 2, wherein when the capability information indicates being capable of solving the multi-card communication conflict problem in the terminal, the capability information further indicates at least one of:

a way that the multi-card communication conflict problem in the terminal is able to be solved, or a type of the multi-card communication conflict problem in the terminal that is able to be solved.

4. The method of claim 3, wherein the way comprises at least one of:

changing a user equipment identity of a subscriber identity module (SIM) card, providing an offset corresponding to the user equipment identity of the SIM card, changing an algorithm for determining a paging occasion based on the user equipment identity of the SIM card, providing a paging reason, and allowing the SIM card to be temporarily disconnected; and wherein the type comprises at least one of:

a conflict between monitoring a paging message by a first SIM card and monitoring a paging message by a second SIM card in the terminal;

a conflict between a communication operation of the first SIM card and monitoring the paging message by the second SIM card in the terminal;

a conflict between the communication operation of the first SIM card and a response of the second SIM card to the paging message in the terminal;

a conflict between the communication operation of the first SIM card and measuring a signal by the second SIM card in the terminal;

a conflict between the communication operation of the first SIM card and receiving system information by the second SIM card in the terminal; and a conflict between the communication operation of the first SIM card and updating a tracking area by the second SIM card in the terminal.

5. The method of claim 1, wherein exchanging, with the core network, the capability information for solving the multi-card communication conflict problem in the terminal, comprises:

in response to setting up an interface with the core network, exchanging, with the core network, the capability information for solving the multi-card communication conflict problem in the terminal.

6. The method of claim 5, wherein the first capability information is carried in an interface setup request signaling;

wherein the first capability information is further configured to indicate capabilities of other base stations connected to the base station to solve the multi-card communication conflict problem in the terminal.

7. The method of claim 6, further comprising:

in response to an update of the first capability information, sending updated first capability information to the core network via the interface with the core network.

8. The method of claim 5, wherein exchanging, with the core network, the capability information for solving the multi-card communication conflict problem in the terminal, comprises:

receiving second capability information sent by the core network, wherein the second capability information is configured to indicate a capability of the core network to solve the multi-card communication conflict problem in the terminal;

wherein the second capability information is carried in an interface setup response signaling;

wherein the method further comprises: receiving updated second capability information sent by the core network via the interface with the core network.

9. A communication device, comprising:

a processor;

a memory for storing instructions executable by the processor;

wherein the processor is configured to implement the method for capability exchange according to claim 1.

10. A method for capability exchange, performed by a core network, the method comprising:

exchanging, with a base station, capability information for solving a multi-card communication conflict problem in a terminal; and in response to a capability of the core network to solve the multi-card communication conflict problem in the terminal being different from a capability of the base station to solve the multi-card communication conflict problem in the terminal, sending an interface setup failure signaling to the base station;

wherein exchanging, with the base station, the capability information comprises: receiving first capability information sent by the base station, wherein the first capability information is configured to indicate the capability of the base station to solve the multi-card communication conflict problem in the terminal.

11. The method of claim 10, wherein the capability information indicates one of:

being capable of solving the multi-card communication conflict problem in the terminal, and being incapable of solving the multi-card communication conflict problem in the terminal.

12. The method of claim 11, wherein when the capability information indicates being capable of solving the multi-card communication conflict problem in the terminal, the capability information further indicates at least one of:

a way that the multi-card communication conflict problem in the terminal is able to be solved, or a type of the multi-card communication conflict problem in the terminal that is able to be solved.

13. The method of claim 12, wherein the way comprises at least one of:

changing a user equipment identity of a subscriber identity module (SIM) card, providing an offset corresponding to the user equipment identity of the SIM card, changing an algorithm for determining a paging occasion based on the user equipment identity of the SIM card, providing a paging reason, and allowing the SIM card to be temporarily disconnected; and wherein the type comprises at least one of:

a conflict between monitoring a paging message by a first SIM card and monitoring a paging message by a second SIM card in the terminal;

a conflict between a communication operation of the first SIM card and monitoring the paging message by the second SIM card in the terminal;

a conflict between the communication operation of the first SIM card and a response of the second SIM card to the paging message in the terminal;

a conflict between the communication operation of the first SIM card and measuring a signal by the second SIM card in the terminal;

a conflict between the communication operation of the first SIM card and receiving system information by the second SIM card in the terminal; and a conflict between the communication operation of the first SIM card and updating a tracking area by the second SIM card in the terminal.

14. The method of claim 10, wherein exchanging, with the base station, the capability information for solving the multi-card communication conflict problem in the terminal, comprises:

in response to setting up an interface with the base station, exchanging, with the base station, the capability information for solving the multi-card communication conflict problem in the terminal.

15. The method of claim 14, wherein the first capability information is carried in an interface setup request signaling;

wherein the first capability information is further configured to indicate capabilities of other base stations connected to the base station to solve the multi-card communication conflict problem in the terminal.

16. The method of claim 14, wherein exchanging, with the base station, the capability information for solving the multi-card communication conflict problem in the terminal, comprises:

sending second capability information to the base station, wherein the second capability information is configured to indicate a capability of the core network to solve the multi-card communication conflict problem in the terminal;

wherein the second capability information is carried in an interface setup response signaling;

wherein the method further comprises: in response to an update of the second capability information, sending updated second capability information to the base station via the interface with the base station.

17. A communication device, comprising:

a processor;

a memory for storing instructions executable by the processor;

wherein the processor is configured to implement the method for capability exchange according to claim 10.

18. A method for exchange triggering, performed by a terminal, the method comprising:

in response to there being a multi-card communication conflict, sending a multi-card communication conflict problem to at least one of a base station or a core network, so as to trigger that capability information of the base station for solving the multi-card communication conflict is exchanged with the core network, or capability information of the core network for solving the multi-card communication conflict is exchanged with the base station;

wherein an interface setup failure signaling is sent from the core network to the base station, and the interface setup failure signaling carries an interface setup failure reason that a capability of the core network to solve the multi-card communication conflict problem in the terminal is different from a capability of the base station to solve the multi-card communication conflict problem in the terminal;

wherein first capability information is sent from the base station to the core network, and the first capability information is configured to indicate the capability of the base station to solve the multi-card communication conflict problem in the terminal.

19. A communication device, comprising:

a processor;

a memory for storing instructions executable by the processor;

wherein the processor is configured to implement the method for exchange triggering according to claim 18.

* * * * *